United States Patent
Rittweger et al.

(10) Patent No.: US 12,479,133 B2
(45) Date of Patent: Nov. 25, 2025

(54) COMBINED PRODUCTION METHOD FOR A MOULDING TOOL FOR THE MOULDING VULCANIZATION OF A VEHICLE TIRE AND VEHICLE TIRE

(71) Applicant: Continental Reifen Deutschland GmbH, Hannover (DE)

(72) Inventors: Stefan Rittweger, Garbsen (DE); Juraj Jurco, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 931 days.

(21) Appl. No.: 17/753,677

(22) PCT Filed: Aug. 24, 2020

(86) PCT No.: PCT/EP2020/073647
§ 371 (c)(1),
(2) Date: Mar. 10, 2022

(87) PCT Pub. No.: WO2021/047897
PCT Pub. Date: Mar. 18, 2021

(65) Prior Publication Data
US 2022/0339824 A1   Oct. 27, 2022

(30) Foreign Application Priority Data
Sep. 11, 2019   (DE) .................... 10 2019 213 874.8

(51) Int. Cl.
*B29C 33/38*   (2006.01)
*B23K 26/362*   (2014.01)
(Continued)

(52) U.S. Cl.
CPC ........ *B29C 33/3842* (2013.01); *B23K 26/362* (2013.01); *B29D 30/0606* (2013.01);
(Continued)

(58) Field of Classification Search
CPC .... B29D 2030/0616; B29D 2030/0612; B23K 26/362; B29C 33/3842
See application file for complete search history.

(56) References Cited

U.S. PATENT DOCUMENTS 6,253,815 B1 * 7/2001 Kemp ................... B60C 13/001
                                                        152/209.19
2012/0227879 A1   9/2012 Muhlhoff et al.
(Continued)

FOREIGN PATENT DOCUMENTS

CN   103596777 A   2/2014
CN   106457711 A   2/2017
(Continued)

OTHER PUBLICATIONS

Chinese Second Office Action dated Novmeber 30, 2023 corresponding to Chinese Patent Application No. 202080063581.7 and DeepL translation of same.
(Continued)

*Primary Examiner* — Elizabeth M Kerr
(74) *Attorney, Agent, or Firm* — Richard A. Wolf; Gregory Adams

(57) ABSTRACT

A method for producing a molding tool (5) of a vulcanization device for the molding vulcanization of a vehicle tire (1), wherein the molding tool (5) has a negative contrast structure (6) on a molding surface of the molding tool (5), with the following steps: a) providing the molding tool (5) having the molding surface for the stamping of a surface (2, 3) of a vehicle tire (1) in a molding manner in the course of the vulcanization of the tire by means of the vulcanization device, b) creating a first surface structure (9) of first depressions (10) by means of a machining process, wherein the first surface structure (9) extends at least over a surface region (7) of the molding surface, c) creating a second surface structure (11) of second depressions (12) by means
(Continued)

of laser engraving, wherein the second structure (11) extends at least over the surface region (7) and wherein the first surface structure (9) and the second surface structure (11) together form the negative contrast structure (6) in the surface region (7).

6 Claims, 5 Drawing Sheets

(51) Int. Cl.
    *B29D 30/06*    (2006.01)
    *B29D 30/72*    (2006.01)

(52) U.S. Cl.
    CPC ............... *B29D 2030/0612* (2013.01); *B29D 2030/0616* (2013.01); *B29D 2030/726* (2013.01)

(56) References Cited

U.S. PATENT DOCUMENTS

| | | |
|---|---|---|
| 2014/0040967 A1 | 2/2014 | Oztaskent et al. |
| 2014/0166177 A1 | 6/2014 | Muhlhoff et al. |
| 2014/0216622 A1* | 8/2014 | Muhlhoff .............. B29C 33/424 152/523 |
| 2014/0305562 A1* | 10/2014 | Shiga ................. B29D 30/0601 152/209.15 |
| 2015/0246587 A1 | 9/2015 | Muhlhoff et al. |
| 2016/0137008 A1 | 5/2016 | Emorine et al. |
| 2016/0152095 A1 | 6/2016 | Berger et al. |
| 2016/0185163 A1 | 6/2016 | Muhlhoff et al. |
| 2017/0050473 A1 | 2/2017 | Muhlhoff et al. |
| 2017/0080656 A1 | 3/2017 | Muhlhoff et al. |
| 2017/0213117 A1 | 7/2017 | Kraus |
| 2019/0047331 A1 | 2/2019 | Iwabuchi et al. |
| 2021/0016608 A1 | 1/2021 | Rittweger |

FOREIGN PATENT DOCUMENTS

| | | |
|---|---|---|
| DE | 102013223567 A1 | 4/2015 |
| DE | 102016215732 A1 | 3/2018 |
| EP | 0755810 A2 | 1/1997 |
| EP | 2977934 A1 | 1/2016 |
| EP | 3409511 A1 | 12/2018 |
| WO | 0009348 A1 | 2/2000 |
| WO | 2014040967 A1 | 3/2014 |
| WO | 2015165863 A1 | 11/2015 |
| WO | 2017131091 A1 | 8/2017 |
| WO | 2018065135 A1 | 4/2018 |

OTHER PUBLICATIONS

Chinese Office Action dated May 10, 2023 corresponding to Chinese Patent Application No. 202080063581.7.
International Search Report dated Nov. 17, 2020 of International Application PCT/EP2020/073647 on which this application is based.

* cited by examiner

COMBINED PRODUCTION METHOD FOR A MOULDING TOOL FOR THE MOULDING VULCANIZATION OF A VEHICLE TIRE AND VEHICLE TIRE

The invention relates to a method for producing a molding tool of a vulcanization device for the molding vulcanization of a vehicle tire, wherein the molding tool has a negative contrast structure on a molding surface of the molding tool. The invention also relates to a vehicle tire produced by means of the molding tool.

Such a negative contrast structure is generally stamped in a molding manner into the surface of the tire, in particular on at least one of the sidewalls of the tire and/or the tread, in the course of the vulcanization of the tire by means of the vulcanization mold. The surface of the tire consequently has a positive contrast structure complementing the negative contrast structure.

Such positive contrast structures are known. They are used for example to provide a marking on the tire sidewall and/or on the tread. A marking may comprise an image, a character, a machine-readable code, a company name, a company logo, an identification, an area, etc. The positive contrast structure may provide the marking entirely or partly and/or surround it entirely or partly.

A positive contrast structure creates a contrast with non-structured or otherwise structured surface regions. In this way, for example, markings can be made more visible.

The negative contrast structure is usually created on the molding surface of a molding tool by means of a machining process. However, the disadvantage of negative contrast structures created in this way is that the resulting positive contrast structure usually either only has a limited contrast effect or is laborious in terms of mold making and later handling in tire production, for example with regard to cleaning and venting.

US 2012 0227879 A1 discloses providing a negative contrast structure of a molding tool for tires by means of laser engraving. However, laser engraving is laborious.

The object is therefore to provide a method for producing a molding tool having a negative contrast structure on its molding surface, which method is improved with regard to the contrast effect of the positive contrast structure on the tire and the production of the molding tool.

This is achieved by the method comprising at least the following steps:
a) providing the molding tool having the molding surface for the stamping of a surface of a vehicle tire in a molding manner in the course of the vulcanization of the tire by means of the vulcanization device,
b) creating a first surface structure of first depressions by means of a machining process, wherein the first surface structure extends at least over a surface region of the molding surface,
c) creating a second surface structure of second depressions by means of laser engraving, wherein the second surface structure extends at least over the surface region and wherein the first surface structure and the second surface structure together form the negative contrast structure in the surface region.

The method combines two different production methods for creating a negative contrast structure having first and second depressions. A vehicle tire which is produced by molding vulcanization of a green tire with a vulcanization device having such a molding tool has on its surface a positive contrast structure complementing the negative contrast structure. The positive contrast structure has first elevations, complementing the first depressions of the negative contrast structure, and second elevations, complementing the second depressions of the negative contrast structure.

In step b), the first depressions are produced by means of a conventional machining process. This can be performed for example by milling by means of a milling head. In this way, simple structures, such as for example elongated depressions which are aligned in one direction, can be created particularly efficiently. They may be for example hatching ribs which are preferably aligned largely parallel to one another in a straight line. However, the structures that can be efficiently created by machining processes are limited in their geometry, for example by the width and flank angle of the milling head, as well as in their alignment. The cross section of an elongated first depression may be determined for example by the geometry of the milling head. The first depressions may be arranged in contact with one another or at a distance from one another. The first surface structure may extend exactly over the surface or beyond it.

In step c), second depressions are created by means of laser engraving. The laser engraving allows the geometry, in particular for example the choice of the flank angles of elongated depressions, and/or the alignment, in particular a non-linear alignment, of the depressions to be selected more flexibly. The second depressions may be arranged in contact with one another or at a distance from one another. The second surface structure may extend exactly over the surface or beyond it.

In laser engraving, a laser beam generated by a laser is directed onto a surface to be engraved. The engraving is performed by means of the energy input onto the surface caused by the laser beam. For this purpose, the laser beam and the surface are usually moved relative to one another, so that the laser beam is guided over the surface depending on the structure to be engraved. A device for guiding the laser beam may be used for this purpose. By adapting the speed of the relative movement and parameters of the laser beam, such as for example the intensity and/or focus of the laser beam, the resulting engraved structure and the engraving time can be optimized. It may be a continuous or a pulsed laser.

The combination of steps b) and c) consequently allows greater flexibility in the creation of the negative contrast structure and structures which achieve an improved contrast effect in the positive on the tire can be achieved in a simplified manner.

At the same time, the production time can be shortened in comparison with the production of a corresponding molding surface by only a machining process or by only laser engraving. The production effort can consequently be reduced with an advantageous contrast effect.

Consequently, a method for producing a molding tool having a negative contrast structure on its molding surface which is improved with regard to the contrast effect of the positive contrast structure on the tire and the production of the molding tool is provided.

The molding tool is preferably made of steel, at least in the region of the molding surface. The molding surface may also have a coating. Steel can be worked both by means of a machining process and by means of laser engraving. At the same time, such a molding tool has proven to be very suitable for the molding vulcanization of a large number of tires.

Step b) may be performed before or after step c). Step b) is preferably performed before step c).

An advantageous embodiment is given by the fact that all of the first depressions are created in step b) and all of the second depressions are created at a separate time and/or in a separate location in step c).

As a result, the negative structure can be created particularly efficiently, since production steps b) and c) can be performed at a separate time and/or in a separate location from one another. The means for the machining process and for the laser engraving can consequently be used at a separate time and/or in a separate location from one another and do not have to be combined with one another in one apparatus.

Step b) may be performed before or after step c). Step b) is preferably performed before step c).

An advantageous embodiment is given by the fact that the second depressions have a surface which has a greater surface roughness than a surface of the first depressions, preferably greater by a factor of 10, particularly preferably greater by a factor of 20. Depressions created by laser engraving, such as the second depressions, generally have a greater surface roughness due to the manufacturing process than depressions such as the first depressions created by machining processes.

The surface roughness can be determined in accordance with DIN EN ISO 4287: 1998. The surface roughness is the arithmetic mean of the individual roughnesses of successive individual measuring distances. The individual roughness is the maximum difference in height within an individual measuring distance.

In this way, a difference in the surface roughness of the first and second depressions caused by the different production processes can be achieved. Correspondingly, the second elevations of the complementary positive contrast structure on the tire can then also have a correspondingly greater surface roughness than the first elevations. As a result, different reflection properties of the first and second elevations are made possible.

In this way, too, the contrast effect of the corresponding positive contrast structure on the tire can be specifically influenced by the combination of the two methods for creating the depressions.

An advantageous embodiment is given by the fact that at least one first depression has an elongated shape, preferably that at least one first depression has a length that is at least twice, particularly preferably at least four times, greater than the width of the at least one first depression. On the tire, the at least one complementary first elevation of the positive contrast structure has a corresponding shape.

Machining processes are particularly suitable for the efficient creation of depressions with an elongated shape. Here, the machining tool can be guided over the molding tool in a preferably straight line while maintaining the same relative height in relation to the original molding surface. It is particularly efficient if the first depression has a length which is at least 4 times greater than the width of the first depression.

The width and the length of a depression can be determined halfway up the depression.

It is expedient if a number, preferably all, of the first depressions have such an elongated shape. The first depressions of an elongated shape may be the negative shapes of hatching ribs. Such hatching ribs allow a good contrast effect on the tire along with enabling good production. It is expedient if a number of first depressions of an elongated shape are arranged largely parallel to one another.

An advantageous embodiment is given by the fact that at least one second depression has an elongated shape, preferably that at least one second depression has a length that is at least 2 times, particularly preferably at least 4 times, greater than the width of the at least one second depression. On the tire, the at least one complementary second elevation of the positive contrast structure has a corresponding shape.

Elongated depressions can also be efficiently created by means of laser engraving. It is expedient if a number, preferably all, of the second depressions have such an elongated shape. Second depressions of an elongated shape may be the negative shapes of hatching ribs. It is expedient if a number of second depressions of an elongated shape are arranged largely parallel to one another.

This also allows an advantageous contrast effect of the complementary positive contrast structure on the tire.

An advantageous embodiment is given by the fact that the first structure has a number of first elongated depressions and the second structure has a number of second elongated depressions and that the first depressions and the second depressions are arranged largely parallel to one another, preferably largely parallel to one another and alternating. The complementary positive contrast structure on the tire can be formed accordingly.

This results in a particularly simple embodiment. By combining the first depression with the second depression, the advantages of both structures and their production methods can come into play despite the simple structure. The first depressions can consequently be created particularly efficiently and the second depressions can be made for example with a small flank angle by means of laser engraving.

This allows the contrast effect of the complementary positive contrast structure on the tire to be specifically influenced, with at the same time simple structures.

An advantageous embodiment is given by the fact that at least one first elongated depression and at least one second elongated depression are arranged so as to cross one another.

Such crossing structures allow a particularly good contrast effect to be achieved, while at the same time supporting the positive contrast structure on the tire and enabling good venting in tire production. It may be that, when the depression of the two crossing depressions that is created second was being created, the removal of material did not take place over the entire length of the depression but was interrupted in the crossing region by the other depression of the two crossing depressions that had already been created previously. The depression consequently created second may consequently have an interruption in the crossing region.

An advantageous embodiment is given by the fact that at least one second depression has a length which is less than twice the height of the second depression.

Such depressions can be created more easily by laser engraving than by means of a machining process. It is expedient if a number or all of the second depressions are formed in this way.

The complementary positive contrast structure on the tire has advantageous short second elevations.

An advantageous embodiment is given by the fact that at least one second depression has a curvature or a kink in its longitudinal extent.

Such depressions with a non-linear extent can be created more easily by laser engraving than by means of a machining process. It is expedient if a number or all of the second depressions are formed in this way.

The first depressions and the second depressions may each have mutually opposite flanks which enclose an angle with one another. The flanks may each enclose the same angle with one another. But they may also differ in that respect.

This allows a very flexible setting of the contrast effect of the corresponding complementary positive contrast structure on the tire.

An advantageous embodiment is given by the fact that at least one first depression has mutually opposite flanks which enclose an angle of at least 50°, preferably of 55° to 65°, with one another and that at least one second depression has mutually opposite flanks which enclose an angle of 4° to 30°, preferably of 10° to 20°, particularly preferably of 12° to 16°, with one another.

By means of a machining process, such as for example milling, it is particularly easily possible to create depressions which have mutually opposite flanks which enclose an angle of at least 50°, preferably of 55° to 65°, with one another. On the other hand, angles of less than 50° can only be achieved with greater effort.

By means of laser engraving, on the other hand, smaller angles can also be achieved more easily. In particular, mutually opposite flanks which enclose an angle of from 4° to 30°, preferably from 10° to 20°, particularly preferably from 12° to 16°, with one another can be achieved.

Consequently, the advantages of the two methods are combined with one another. The contrast effect that can be created by the complementary positive contrast structure is improved by the different angles.

It is expedient if a number or all of the second depressions and/or first depressions are formed in this way.

An advantageous embodiment is given by the fact that the height of the at least one first depression and/or the height of the at least one second depression is a maximum of 0.8 mm, preferably a maximum of 0.6 mm, particularly preferably a maximum of 0.4 mm.

Such a negative contrast structure can be efficiently created by means of a machining process and laser engraving. At the same time, the small dimensions allow an outstanding contrast effect of the complementary positive contrast structure. The height can be measured relative to the unmachined molding surface of the surface region of the molding tool before step b).

The invention also relates to a molding tool of a vulcanization mold for the molding vulcanization of a vehicle tire, produced according to the method set out.

The invention also relates to a vehicle tire produced by molding vulcanization of a green tire with a vulcanization device having a molding tool with a negative contrast structure on a surface region of a molding surface of the molding tool according to the method shown, wherein the vehicle tire has on its surface, in particular on at least one sidewall and/or the tread, the positive contrast structure complementing the negative contrast structure.

The positive contrast structure has an advantageous contrast effect while at the same time reducing the effort involved in the production of the mold and tire. The positive contrast structure may for example provide a marking entirely or partly or surround it entirely or partly. The positive contrast structure has first elevations, complementing the first depressions of the negative contrast structure, and second elevations, complementing the second depressions of the negative contrast structure. The geometry and arrangement and surface properties of the first and second depressions created on the molding surface consequently determine the complementary geometry and arrangement and surface properties of the first and second elevations of the positive contrast structure.

It is expedient if the second elevations have a surface which has a greater surface roughness than a surface of the first elevations, preferably greater by a factor of 10, particularly preferably greater by a factor of 20. The surface roughness can be determined in accordance with DIN EN ISO 4287: 1998. In this way, a difference in the surface roughness of the first and second elevations caused by the different production processes can be achieved, whereby the contrast effect can be selectively influenced.

It is expedient if the tire is a pneumatic vehicle tire. It may be a pneumatic vehicle tire for a bicycle, for a passenger car, a van, an SUV, a light truck, a utility vehicle, a motorcycle or a bus. It is particularly preferably a pneumatic vehicle tire for a passenger car. Such pneumatic vehicle tires generally have a smaller sidewall height than the other pneumatic vehicle tires mentioned. As a result, the space for providing characters such as writing or images is usually limited. A high contrast effect is consequently particularly advantageous for good readability and/or recognizability.

An advantageous embodiment is given by the fact that the vehicle tire has a number of surfaces having the contrast structures, wherein the surfaces are arranged in such a way that they represent a machine-readable code, preferably a two-dimensional code, particularly preferably a QR code.

As a result of the outstanding contrast effect of the positive contrast structure with at the same time the advantageous producibility of the molding means, such an arrangement is outstandingly suitable for depicting a machine-readable code, in particular for depicting the areas of the code that are usually shown as dark. The areas of the code that are usually shown as light can be formed by a largely unworked surface or a surface of the vehicle tire that is smooth in comparison with the positive contrast structure.

Further features, advantages and details of the invention will now be explained in more detail with reference to the schematic drawings, which represent exemplary embodiments. In the drawings.

Figure 1:
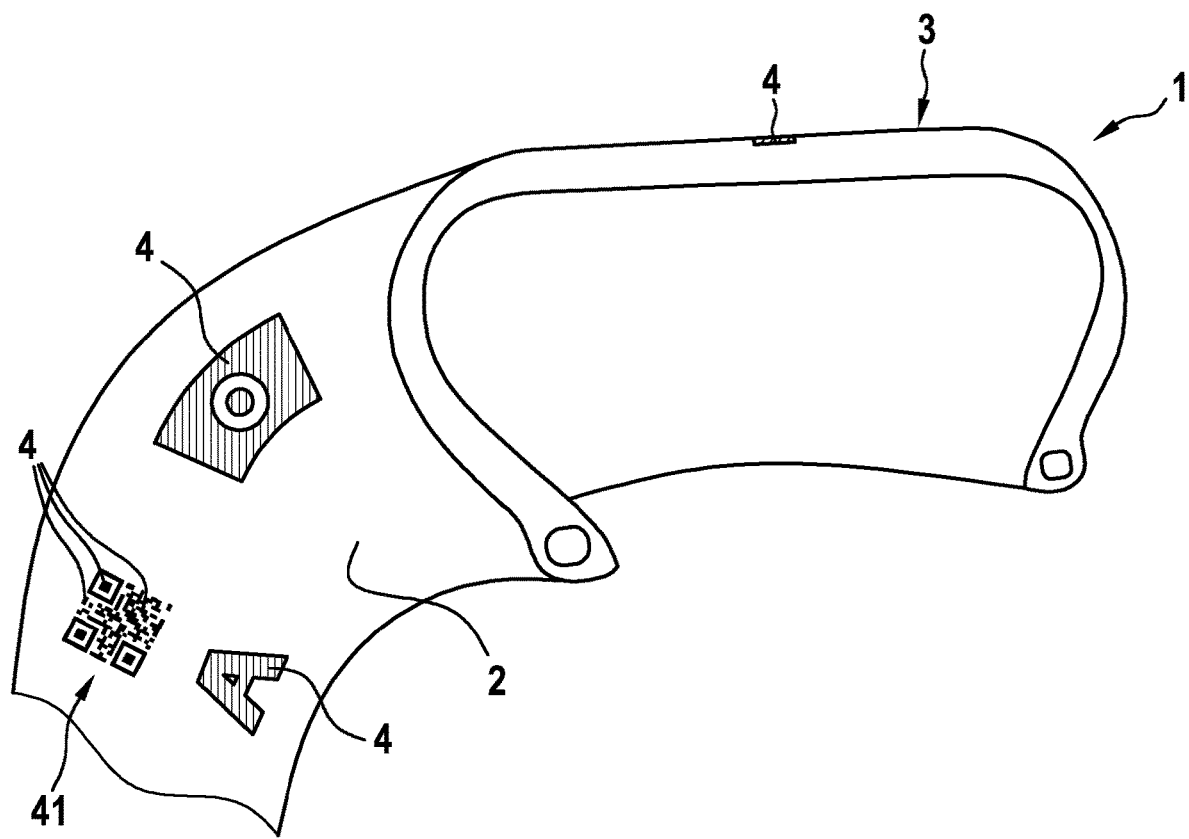
FIG. 1 shows a pneumatic vehicle tire having a positive contrast structure.

FIG. 1 shows a pneumatic vehicle tire 1 with sidewalls 2 and a tread 3 and with at least one positive contrast structure 4 on at least one of the sidewalls 2 and/or the tread 3. In the case of an arrangement on the tread 3, the positive contrast structure 4 may in particular also be provided on groove flanks and/or groove bases of grooves running in the tread 3, or at the tread runout, that is to say at the shoulder flanks running outside the ground contact area to the sidewalls, or on the outer surface of the tread, that is to say on tread that comes into contact with the ground.

The tire is produced by molding vulcanization of a green tire with a vulcanization device having a molding tool with a negative contrast structure 6 complementing the positive contrast structure 4 on a surface region 7 of a molding surface of the molding tool 5.

Such a positive contrast structure 4 is outstandingly suitable for depicting a code 41, in particular a two-dimensional code such as for example a QR code. In this case, the areas of the code that are usually shown as dark can be formed as having the positive contrast structure 4.

Figure 2:
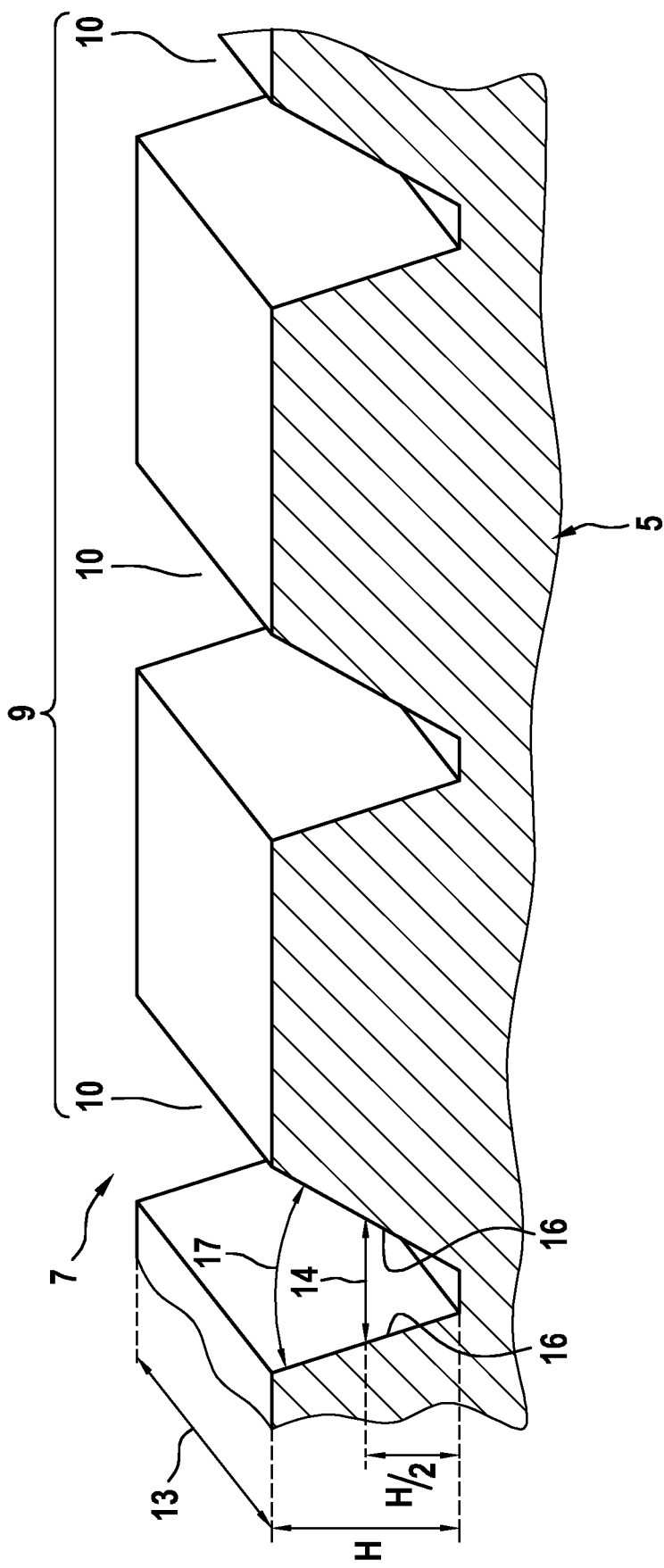
FIG. 2 shows a molding tool after step b)
Figure 3:
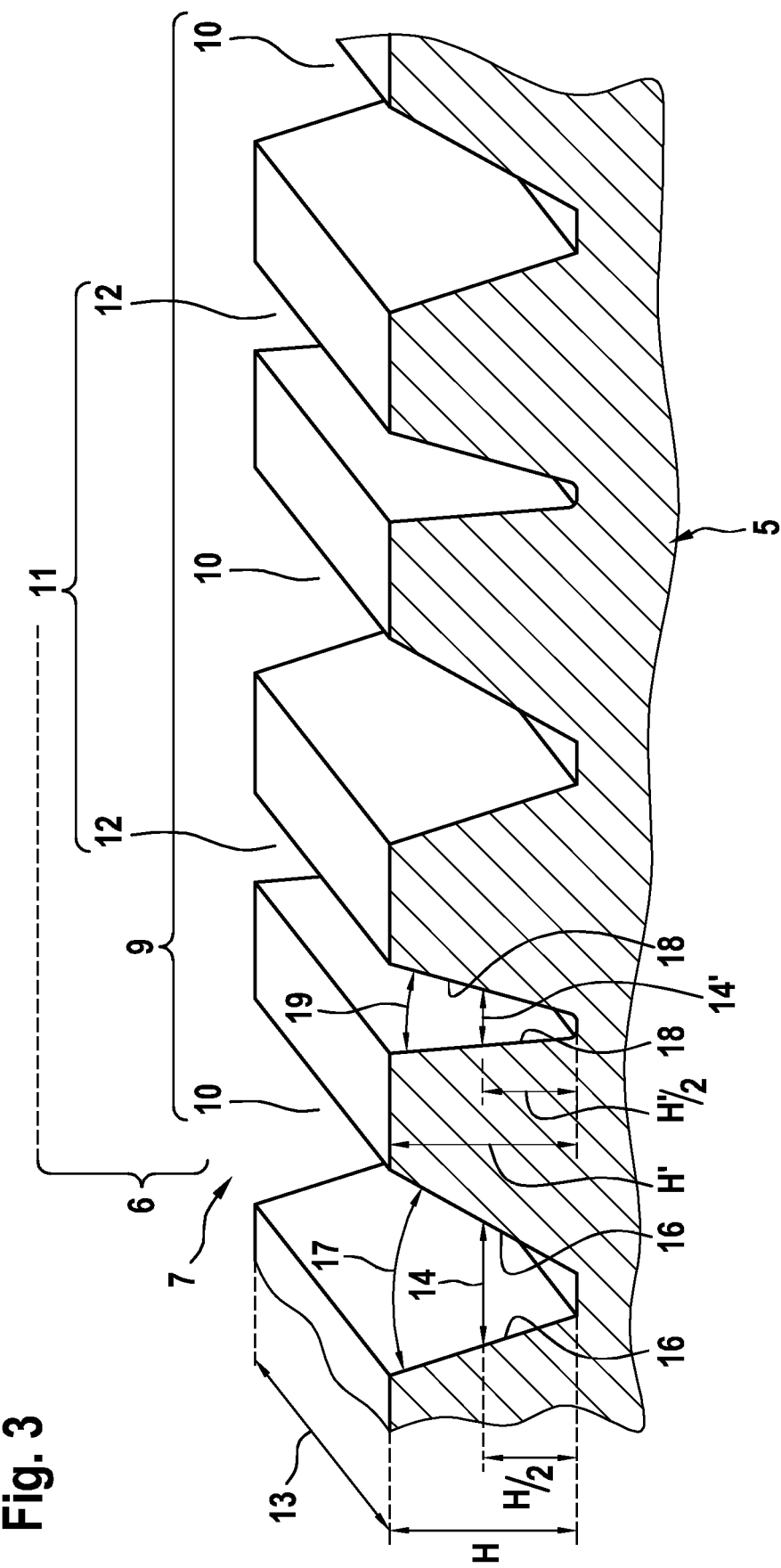
FIG. 3 shows the molding tool after step c)

FIGS. 2 and 3 serve to illustrate the production of a molding tool 5 suitable for the molding vulcanization.

The method comprises the following steps:

a) providing the molding tool 5 having the molding surface for the stamping of a surface 2, 3 of a vehicle tire 1 in a molding manner in the course of the vulcanization of the tire by means of the vulcanization device, b) creating a first surface structure 9 of first depressions 10 by means of a machining process, wherein the first surface structure 9 extends at least over a surface region 7 of the molding surface, c) creating a second structure 11 of second depressions 12 by means of laser engraving, wherein the second surface structure 11 extends at least over the surface region 7 and wherein the first surface structure 9 and the second surface structure 11 together form the negative contrast structure 6 in the surface region 7.

FIGS. 2 and 3 illustrate the method when step b) takes place before step c). However, step c) may also be performed first and then step b).

FIG. 2 shows a section through the molding tool 5 with the surface region 7 after step b). The first surface structure 9 of first depressions 10 has already been created by a machining process, such as for example milling. The first surface structure 9 extends at least over the surface region 7.

In step c), a second surface structure 11 of second depressions 12 is created by means of laser engraving. The second surface structure 11 extends at least over the surface region 7, as a result of which the first structure 9 and the second structure 11 together form the negative contrast structure 6 in the surface region 7.

FIG. 3 shows a section through the molding tool 5 with the surface region 7 after step c). In addition to the first depressions 10 of the first surface structure 9 created by the machining process, the surface region 7 now also has the second depressions 12 of the second surface region 11 created by laser engraving. The first surface structure 9 and the second surface structure 11 together form the negative contrast structure 6 in the surface region 7.

The second depressions 12 may have a surface 18 which has a greater surface roughness according to DIN EN ISO 4287:1998 than a surface 16 of the first depressions 10, preferably greater by a factor of 10, particularly preferably greater by a factor of 20.

Preferably, all of the first depressions 10 have first been created in step b) and all of the second depressions 12 have been created at a separate time and/or in a separate location therefrom in a subsequent step c). The means for the machining process and for the laser engraving can consequently be used at a separate time and/or in a separate location from one another and do not have to be combined with one another in one apparatus.

As shown in FIG. 2, at least one first depression may have an elongated shape. The at least one first depression 10 preferably has a length 13 that is at least twice, particularly preferably at least four times, greater than the width 14 of the at least one first depression 10. In the representation, all of the first depressions 10 have such an elongated shape.

The width 14 and the length 13 of the first depression 10 can be determined at half the height H of the depression. In the representation As shown in FIG. 3, at least one second depression may have an elongated shape. The at least one second depression 12 preferably has a length 13 that is at least 2 times, particularly preferably at least 4 times, greater than the width 14' of the at least one second depression 12. In the representation, all of the second depressions 12 have such an elongated shape.

The width 14' and the length of the second depression 12 can be determined at half the height H' of the depression.

In step b), a number of first elongated depressions 10 and in step c) a number of second elongated depressions 12 have been created. The first depressions 10 and the second depressions 12 are created as arranged largely parallel to one another, preferably largely parallel to one another and alternating.

As shown, the depressions 10, 12 may be aligned largely in a straight line. Alternatively, however, at least one second depression 12 may also have a curvature or a kink in its elongated extent.

The first depressions 10 and the second depressions 12 may have in each case mutually opposite flanks 16, 18 which enclose an angle 17, 19 with one another. The flanks 16, 18 may each enclose the same angle 17, 19 with one another. But they may also differ in that respect. As shown, at least one first depression 10 may have mutually opposite flanks 16 which enclose an angle 17 of at least 50°, preferably of 55° to 65°, with one another and at least one second depression 12 may have mutually opposite flanks 18 which enclose an angle 19 of 4° to 30°, preferably of 10° to 20°, particularly preferably of 12° to 16°, with one another.

The height H of the at least one first depression 10 and/or the height H' of the at least one second depression 12 may be a maximum of 0.8 mm, preferably a maximum of 0.6 mm, particularly preferably a maximum of 0.4 mm.

The height H, H' can be measured relative to the unworked molding surface of the surface region of the molding tool before step b).

Figure 4:
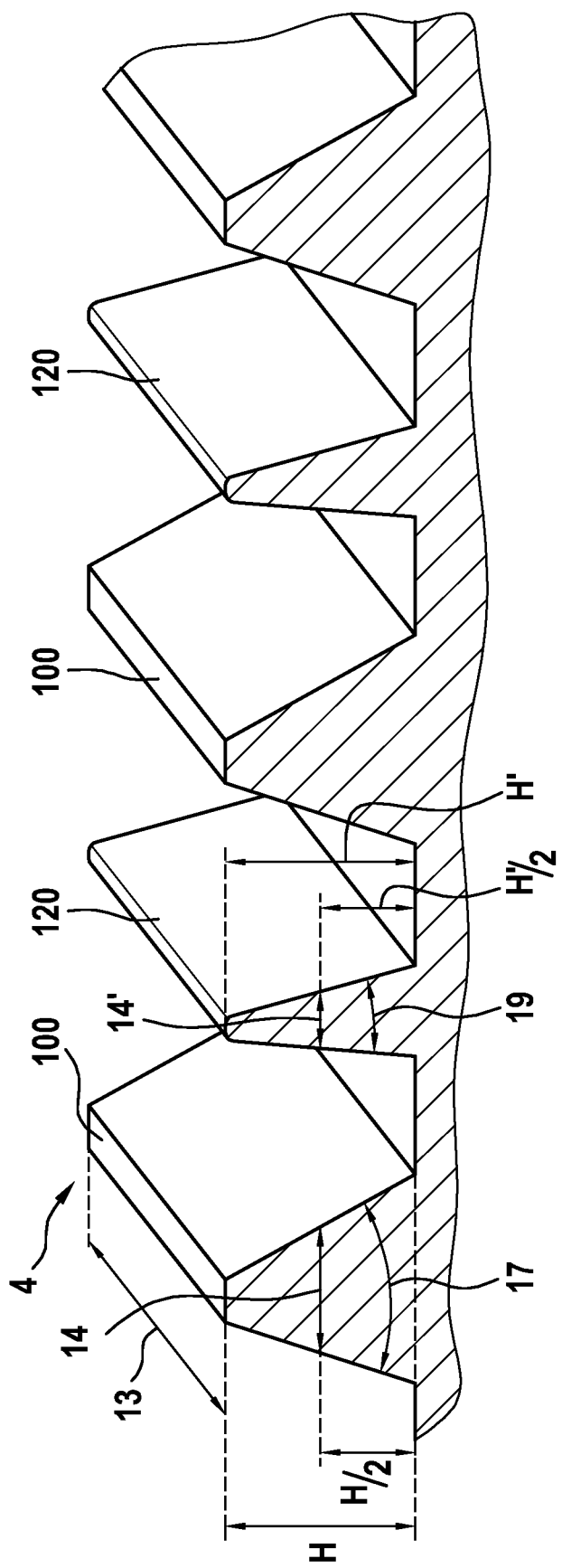
FIG. 4 shows a pneumatic vehicle tire produced by means of the molding tool.

FIG. 4 shows a section through a vehicle tire 1 produced by molding vulcanization of a green tire with a vulcanization device having the molding tool 5 with a negative contrast structure 6 on a surface region 7 of a molding surface of the molding tool produced according to the method explained in FIGS. 2 and 3. The vehicle tire 1 has on its surface 2, 3 the positive contrast structure 4 complementing the negative contrast structure 6. The positive contrast structure 4 shown may be located on at least one of the sidewalls 3 and/or the tread 3. It may be the pneumatic vehicle tire 1 shown in FIG. 1.

The first depressions 10 of the negative contrast structure 6 correspond to complementary first elevations 100 of the positive contrast structure 4. The second depressions of the negative contrast structure 6 correspond to complementary second elevations 120 of the positive contrast structure 4. The positive contrast structure 4 shown corresponds to hatching with hatching ribs 100, 120. The dimensions of the elevations 100, 120 largely correspond to the dimensions of the complementary depressions 10, 12 of the complementary negative contrast structure 6 and are therefore denoted by the same reference signs H, H', 17, 19, 13, 14 as those for the corresponding negative contrast structure 6. The second elevations 120 may have a surface which has a greater surface roughness according to DIN EN ISO 4287:1998 than a surface of the first elevations 100, preferably greater by a factor of 10, particularly preferably greater by a factor of 20.

Figure 5:
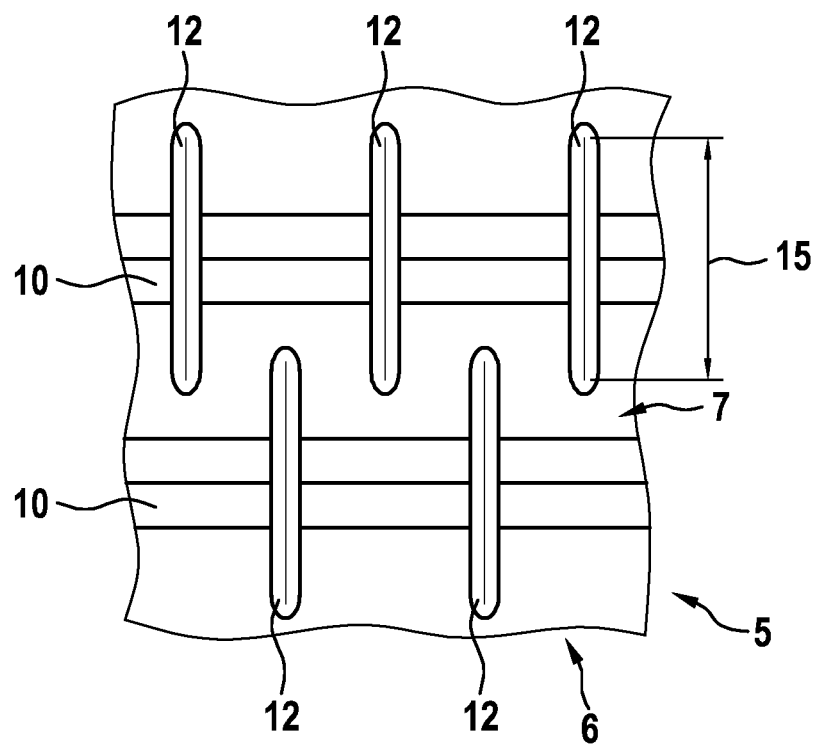
FIG. 5 shows a plan view of a molding tool.

FIG. 5 schematically shows a plan view of a further molding tool 5 produced by means of the method according to the invention. The negative contrast structure 6 differs from the negative contrast structure 6 shown in FIG. 3 at least in that at least one first elongated depression 10 and one second elongated depression 12 are arranged so as to cross one another. In the representation, the second elongated depression 12 has a smaller height H' than the first elongated depression 10.

If the second elongated depression 12 was created after the first elongated depression 10, when the second elongated depression 12 was being created, the removal of material by means of laser engraving did not take place over the entire length 13 of the second elongated depression 12 but was interrupted in the crossing region by the first elongated depression 10 that had already been created previously. The second elongated depression 12 may consequently have an interruption.

The at least one second depression 12 may have a length 13 that is less than twice the height H' of the second depression 12. The length can be measured at half the height H' of the second depression.

LIST OF REFERENCE SIGNS

Part of the Description

1 Pneumatic vehicle tire
2 Sidewall
3 Tread
4 Positive contrast structure
41 Two-dimensional code
5 Molding tool
6 Negative contrast structure
7 Surface region of the molding surface of the molding tool
9 First surface structure
10 First depression
11 Second surface structure
12 Second depression
13 Length
16, 18 Flanks
17, 19 Angles
14, 14' Width
100 First elevation
120 Second elevation
H, H' Height

The invention claimed is:

1. A method for producing a molding tool of a vulcanization device for the molding vulcanization of a vehicle tire, the method comprising:
    a) providing a mold body having a surface region intended to form at least part of a molding surface for the stamping of a surface of the vehicle tire in a molding manner in the course of the vulcanization of the tire by the vulcanization device;
    b) creating a first surface structure in the surface region by a machining process, the first surface structure including a plurality of first elongated depressions extending across the surface region of the molding tool; and
    c) creating a second surface structure in the surface region by laser engraving, the second surface structure including a plurality of second elongated depressions extending across the surface region;
    wherein the first surface structure and the second surface structure together form a negative contrast structure in the surface region of the molding tool;
    wherein the first elongated depressions and the second elongated depressions are arranged laterally with respect to each other and largely parallel to one another; and
    wherein the second plurality of depressions have a surface roughness that is greater than a surface roughness of the first plurality of depressions.

2. The method of claim 1, wherein the first elongated depressions created in step b) are created at a separate time and in a separate location than the creation of the second elongated depressions in step c).

3. The method of claim 1, wherein the surface roughness of the second elongated depressions is greater than the surface roughness of the first elongated depressions by a factor of 10.

4. The method of claim 1, wherein at least one of the second elongated depressions has a length less than twice the height (H') of another of the second elongated depressions.

5. The method of claim 1, wherein each of the first elongated depressions has mutually opposite flanks which enclose an angle of at least 50°.

6. The method of claim 1, wherein the height of the first elongated depressions and/or the height of the second elongated depressions is a maximum of 0.8 mm.

* * * * *